Figure 1:
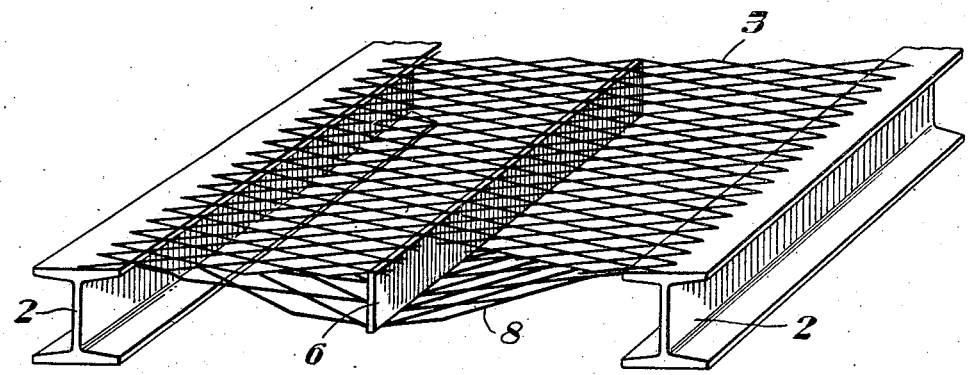

Sept. 24, 1946. W. E. MACK 2,408,083
EXPANDED METAL LOAD BEARING STRUCTURE
Filed Aug. 10, 1944

INVENTOR
Wayne E. Mack

Patented Sept. 24, 1946

2,408,083

UNITED STATES PATENT OFFICE 2,408,083

EXPANDED METAL LOAD BEARING STRUCTURE

Wayne E. Mack, Martins Ferry, Ohio, assignor, by mesne assignments, to Wheeling Steel Corporation, Wheeling, W. Va., a corporation of Delaware Application August 10, 1944, Serial No. 548,890

3 Claims. (Cl. 189—82)

This invention relates to expanded metal load bearing structures of the type employed as walkways and material supports comprising a sheet of expanded metal supported at two opposed edges with reinforcing means applied to the expanded metal between said edges. The invention has to do with the reinforcing which is applied to the expanded metal.

It has been proposed to provide a structure of the type above mentioned in which the expanded metal is reinforced between the supports by a series of parallel bars welded to the expanded metal and extending at right angles to the supports. In that structure no reinforcing is provided parallel to the supports. The transverse reinforcing bars have of necessity had to be positioned close together, which necessitates the employment of a considerable weight of material, resulting in a structure which is undesirably heavy for its load bearing characteristics and which requires a great amount of time and labor for its fabrication. Moreover, the closely spaced parallel transverse bars interfere with the passage of light through the structure, creating solid shadow from overhead light passing at an angle therethrough.

I devised an expanded metal load bearing structure having certain advantages over the structure above described, my said structure being disclosed and claimed in my copending application, Serial No. 538,285. I have now devised an expanded metal load bearing structure somewhat similar to that of my said copending application but different in a number of respects and having further advantages. My present structure provides exceptional strength and also exceptional visibility for the weight of material employed in its fabrication. It is of exceptional utility in overhead walkways and material supports receiving light from below and which are heavily loaded in use.

I provide an expanded metal load bearing structure comprising a sheet of expanded metal supported at two opposed edges and adapted to bear a load between said edges and reinforcing means applied to the sheet between said edges, the reinforcing means comprising a portion extending generally parallel to said edges and a portion extending generally transversely of the sheet, connected with the sheet adjacent said edges and bearing against the first mentioned portion opposite the sheet. The transversely extending portion of the reinforcing means may comprise a second sheet of expanded metal connected with the first mentioned sheet and bearing against the first mentioned portion of the reinforcing means. Desirably the reinforcing means is connected with the primary sheet of expanded metal by welding or the like.

I prefer to employ a bar welded to the sheet of expanded metal being reinforced and extending generally longitudinally thereof and a structural member extending generally transversely of the sheet, welded to the sheet adjacent the supporting edges thereof and bearing against the bar opposite the sheet. The transversely extending structural member is desirably a second sheet of expanded metal.

My structure is such that normally the portion or member of the reinforcing means first referred to above acts in compression and the portion or member second referred to acts in tension. The compression member preferably bears against the sheet, extends generally longitudinally thereof and projects in a direction generally normal to the sheet and the tension member or members is or are connected with the compression member remote from the sheet and with the sheet on opposite sides of the compression member.

I further provide an expanded metal load bearing structure comprising a sheet of expanded metal supported at two opposed edges, disposed with the long dimensions of the diamonds transverse to said edges and adapted to bear a load between said edges and reinforcing means applied to the expanded metal between said edges, the reinforcing means comprising compression means bearing against the sheet generally along a line or lines normal to the long dimensions of the diamonds and tension means connected with the compression means remote from the sheet and with the sheet on opposite sides of the compression means.

Other details, objects and advantages of the invention will become apparent as the following description of a present preferred embodiment thereof proceeds.

Figure 2:
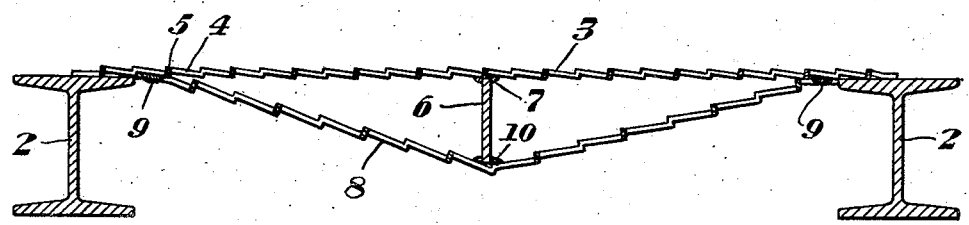

In the accompanying drawing I have shown a present preferred embodiment of the invention in which Figure 1 is a fragmentary diagrammatic perspective view of an expanded metal load bearing structure; and Figure 2 is a vertical transverse cross sectional view to enlarged scale through a structure such as that shown diagrammatically in Figure 1.

Referring now more particularly to the drawing, the expanded metal load bearing structure shown therein is, as above stated, exceptionally well adapted for overhead walkways and material supports receiving light from below and which are heavily loaded in use. It may be employed in industrial plants and is also highly useful when employed as a catwalk atop railroad freight cars.

The supporting structure comprises opposed parallel I-beams 2 upon which the expanded metal is supported at its edges. The expanded metal is designated generally by reference numeral 3 and as shown in Figure 2 is of conventional form, consisting of strands 4 connected by bands 5 to form the typical diamond pattern. The expanded metal is preferably laid upon the I beams 2 with the long dimensions of the diamonds of the expanded metal extending transversely or approximately at right angles to vertical planes containing the axes of the I beams as diagrammatically illustrated in Figure 1. A walkway is made up of a series of sheets of expanded metal laid substantially edge-to-edge along the I beams. If desired the expanded metal 3 may be of the rolled or flattened type.

Bearing against the under surface of the sheet of expanded metal 3 and arranged in a vertical plane parallel to and midway between the flanges of the I beams 2, is a bar 6. The bar as shown is in the shape of a narrow elongated plate and is welded to the sheet of expanded metal 3 by welding material 7. While only one longitudinally extending bar is shown in the drawing, a plurality of such bars may be employed if desired. For example, two parallel bars may be employed, which bars may be disposed at equal distances from the inner edges of the I-beams and from each other or otherwise, depending on the particular conditions to be met.

The reinforcing means for the sheet of expanded metal 3 comprises, in addition to the bar 6, a portion or member designated generally by reference numeral 8 which extends transversely of the structure and is welded to the sheet 3 adjacent the supported edges thereof. The portion 8 is shown as welded to the sheet 3 at 9 close to the inner edge of the upper flange of each of the I beams 2. The member 8 is, as shown, of angular shape and bears against the lower edge of the bar 6 at its mid-portion, extending thence upwardly and outwardly to its points of connection with the sheet 3. The member 8 is welded to the bar 6 at 10.

As shown in the drawing, the member 8 is desirably made of expanded metal. Expanded metal has exceptional strength for its weight and is also highly pervious to light. Thus, a structure employing expanded metal as a tread or supporting surface and expanded metal for reinforcing is of light weight, great strength and very high perviousness to light.

The bar 6 acts in the supporting structure as a compression member and the member 8 acts as a tension member. The effect of the members 6 and 8 when welded to the member 3 is to produce a truss of remarkable strength and rigidity for the weight of material employed.

For the sake of clarity of showing in Figure 1 the sheet 3 is diagrammatically illustrated as though it were solid, i. e., the sheet 8 is not seen through the interstices in the sheet 3. However, it is to be understood that in the preferred structure intended to be illustrated both the sheet 3 and the sheet 8 are of expanded metal of usual form. Materials other than expanded metal may be used in place of the expanded metal member 8 and the member 8 may be connected with the sheet 3 at any desired locations at opposite side of the bar 6. Ordinarily best results are obtained by welding member 8 to the sheet 3 close to the I beams. The welding of the bar 6 to the sheet 3 and the member 8 may be dispensed with since the bar 6 is at all times compressed and frictionally held between the sheet 3 and the member 8, but to avoid displacement and to increase the rigidity of the structure the welding is preferred and is of structural advantage.

While I have shown and described a present preferred embodiment of the invention it is to be distinctly understood that the invention is not limited thereto but may be otherwise various embodied within the scope of the following claims.

I claim:

1. An expanded metal load bearing structure comprising a sheet of expanded metal supported at two opposed edges and adapted to bear a load between said edges and reinforcing means applied to the sheet between said edges, the reinforcing means comprising a portion extending generally parallel to said edges and a portion comprising a second sheet of expanded metal extending generally transversely of the first mentioned sheet, connected with the first mentioned sheet adjacent said edges and bearing against the first mentioned portion opposite the first mentioned sheet.

2. An expanded metal load bearing structure comprising a sheet of expanded metal supported at two opposed edges and adapted to bear a load between said edges and reinforcing means applied to the sheet between said edges, the reinforcing means comprising a bar welded to the sheet and extending generally longitudinally thereof and a second sheet of expanded metal extending generally transversely of the sheet, welded to the sheet adjacent said edges and bearing against the bar opposite the first mentioned sheet.

3. An expanded metal load bearing structure comprising a sheet of expanded metal supported at two opposed edges and adapted to bear a load between said edges and reinforcing means applied to the sheet between said edges, the reinforcing means comprising a bar welded to the sheet and extending generally longitudinally thereof and a second sheet of expanded metal extending generally transversely of the sheet, welded to the sheet adjacent said edges and bearing against and welded to the bar opposite the first mentioned sheet.

WAYNE E. MACK.